United States Patent
Paglia

[15] 3,688,667
[45] Sept. 5, 1972

[54] FILM RETAINING APPARATUS
[72] Inventor: Richard Paglia, Carlisle, Mass.
[73] Assignee: Polaroid Corporation, Cambridge, Mass.
[22] Filed: Jan. 4, 1971
[21] Appl. No.: 103,391

[52] U.S. Cl. .................................................95/13
[51] Int. Cl. ...........................................G03b 17/52
[58] Field of Search.............................95/13, 19, 22

[56] References Cited
UNITED STATES PATENTS

| 3,545,357 | 12/1970 | Erlichman | 95/13 |
| 3,016,175 | 1/1962 | Wareham et al. | 95/13 X |
| 3,087,399 | 4/1963 | Fairbank | 95/13 X |
| 3,412,664 | 11/1968 | Eloranta et al. | 95/13 |
| R26,595 | 6/1969 | Wareham | 95/13 |

Primary Examiner—Samuel S. Matthews
Assistant Examiner—Alan A. Mathews
Attorney—Brown & Mikulka, Lawrence G. Norris and Alfred E. Corrigan

[57] ABSTRACT

A camera of the self-developing type including processing rollers for engaging and advancing a film unit along a film exit plane while distributing processing fluid contained therein over an image-forming area of the film unit. A film supporting member is mounted outboard of the rollers for engaging and releasably supporting the exposed film unit along lateral margins thereof as the film unit is advanced from the bite of the rollers.

13 Claims, 9 Drawing Figures

INVENTOR.
RICHARD PAGLIA

FILM RETAINING APPARATUS

BACKGROUND OF THE INVENTION

1. Field of the Invention

This invention relates to the field of photographic apparatus of the self-developing type which are adapted to automatically expose and process a film unit.

2. Description of the Prior Art

Cameras of the self-developing type which are adapted to automatically expose and process a film unit generally include; a chamber for receiving and supporting a film container, preloaded with a plurality of film units, in position to locate one film unit contained therein at an exposure plane; an optical and exposure control system for exposing the film unit at the exposure plane; means for processing the exposed film unit while advancing it toward the exterior of the camera; and means for engaging the advancing film unit to releasably retain it on the camera until it is manually removed at the convenience of the operator.

The individual film units generally include a photosensitive element, a superposed transparent image-receiving element, a rupturable pod containing a viscous processing fluid joined to the two elements at a leading end of the film unit, a processing fluid trap located at a trailing end of the film unit and an opaque binding member for securing the photosensitive element and the image-receiving element in face-to-face relation and providing opaque peripheral margins on the transparent image-receiving element which define the bounds of a substantially rectangular image-forming area. The film unit is positioned at the exposure plane within the camera with the transparent image-receiving element facing toward the optical system so that the underlying photosensitive element may be exposed by actinic light passing through the transparent image-receiving element within the bounds of the image-forming area. After exposure, the film unit is advanced by any suitable film advancing apparatus, leading end first, into engagement with processing means; i.e., pressure-applying members. The pressure-applying members may take the form of a pair of juxtaposed pressure-applying rollers of which one or both are adapted to be power driven in a direction to advance the engaged film unit therebetween along a film exit plane toward the exterior of the camera and into engagement with a film retainer located on the exit side of the rollers. Compressive pressure is applied to the film unit as it passes between the rollers, causing the fluid containing pod at the leading end thereof to rupture, thereby releasing a viscous processing fluid which is then spread in a thin uniform layer between and in contact with the photosensitive element and the image-receiving element with any excess processing fluid being deposited and retained in the fluid trap at the trailing end of the film unit. The chemical reaction between the processing fluid and the exposed photosensitive element initiates a diffusion transfer process which results in the formation of a positive image of the scene photographed which may be viewed through the transparent image-receiving element.

The camera is adapted to advance the exposed film unit through the pressure-applying rollers in slightly more than one-half of a second. The thin layer of viscous processing fluid spread between the photosensitive and image-receiving elements requires a short period of time to attain a degree of dimensional stability to the extent that it resists physical deformation when subjected to additional pressure. Therefore, it is preferred that additional pressure not be applied to the image-forming area of the film unit until the processing fluid has become dimensionally stable since the added pressure may cause misalignment of the two elements, thereby resulting in a distorted or an incomplete positive image.

U.S. Pat. No. 3,545,357 discloses a camera of the self-developing type which is adapted to automatically expose and process a film unit in much the same manner as described above. Two plates, laterally dimensioned to equal the width of the film unit, are mounted on the exit side of the processing rollers for engaging and releasably retaining a film unit on the camera. An upper plate is fixedly mounted on the camera structure and has a leading edge extending forwardly of the pressure-applying rollers and located so as to be parallel to and slightly above the bite between the pressure-applying rollers. A lower plate, coupled to a mechanism for advancing an exposed film unit into engagement with the rollers, is pivotally mounted for movement between a first position in which the plate is closely adjacent the pressure-applying rollers and in closing relation to the bite between the rollers, and a second position, extending forwardly of the pressure-applying rollers in which a leading edge of the lower plate is located parallel with and slightly below the bite of the rollers where it cooperates with the leading edge of the upper plate to form a narrow gap therebetween through which a film unit is adapted to be advanced by the rollers.

In the operation of the camera disclosed in the above-referenced patent, the lower plate is maintained in the first position to block the passage of actinic light into the camera through the bit between the rollers. A film unit advancing through the rollers engages the lower plate and moves it to the second position permitting the film unit to advance through the opening between the upper and lower plate. The spacing between the upper and lower plate is such that the portion of the film unit forward of the film unit's trap may pass through the opening while the added thickness of the trap will prevent the trailing end of the film unit from passing through the opening until it is manually pulled through the space by the operator.

While the two plate film retainer performs quite well, it is relatively expensive to manufacture because of the dimensional tolerances required to ensure that the lower plate is accurately spaced from the upper plate when it is in the second position. The opening formed by the upper and lower plate must be wide enough to permit the film unit to be advanced therebetween so that both the upper and lower plate do not contact the image-forming area of the film unit at the same time which may cause misalignment of the photosensitive and image-receiving elements and yet be sufficiently narrow to prevent the trap at the trailing end of the film unit from passing through the opening. Also, the leading edges must have a smooth finish to prevent scratching of the transparent image-receiving element, thereby requiring an extra polishing or deburring operation. Further, the film retainer is adapted to support and retain only one film unit at a time.

SUMMARY OF THE INVENTION

The present invention provides a self-developing camera which is adapted to automatically expose and process a film unit. The camera includes processing means in the form of a pair of juxtaposed pressure-applying rollers of which at least one is power driven for engaging and advancing an exposed film unit along a film exit plane toward the exterior of the camera while distributing a processing fluid contained therein over an image-forming area of the film unit. Film-engaging means, i.e., a film retainer, is provided for engaging and supporting the exposed film unit only along peripheral edges thereof which are outside of and form margins surrounding the image-forming area. The film retainer includes a film-supporting plate having an open portion therein through which the film unit is adapted to be partially advanced by the pressure-applying rollers. The film-supporting plate is mounted for movement between a first position in which the open portion is out of alignment with the film exit plane and the bite of the rollers to reduce the admission of light into the camera via the bite, and a second position in which the open portion is in alignment with the film exit plane to permit a film unit to be advanced therethrough. The film retainer is spring biased toward the first position and is movable from the first position to the second position by a film unit advancing through the rollers and along the film exit plane. Two resilient fingers extend across opposite ends of the open portion of the film retainer and frictionally engage the peripheral edges of the film unit outside of the image-forming area to maintain the film retainer in the second position against the bias of the spring urging the retainer toward the first position while allowing the film unit to advance through the open portion. After the film unit passes through the rollers, the resilient fingers cooperate with surfaces on the film-supporting plate to arrest motion imparted to the film unit upon disengagement from the processing rollers and thereafter to releasably retain the film unit.

The film retainer is adapted to support and releasably retain a plurality of film units. Provisions are made for totally disenabling the operation of the camera when the number of film units supported by the film retainer reaches a predetermined limit or the angle of deflection of the film retainer relative to the film exit plane reaches a predetermined angle. The relative spring gradients of the resilient fingers and the spring biasing the film retainer toward the first position are selected such that the second position or the position in which the film unit may pass through the open portion of the film retainer is at a predetermined deplacement angle relative to the film exit plane. The film retainer is configured and dimensioned such that the amount of frictional force applied to marginal edges outside of the image-forming area of the film unit is dependent upon the relative angle between the film exit plane and the film retainer as the film unit passes through the open portion. Upon disengagement of the film unit from the processing rollers, the biasing spring tends to move the film retainer toward the first position rapidly changing the relative angle between the retainer and the film exit plane to apply maximum frictional force to peripheral edges outside of the image-forming area in a minimum amount of time.

Therefore, it is an object of the present invention to provide in photographic apparatus including processing means for engaging and advancing an exposed film unit along a film exit plane toward the exterior of the apparatus while distributing a processing fluid contained therein over an image-forming area of the film unit, and means for engaging and supporting the exposed film unit only along peripheral edges which form margins surrounding the image-forming area to releasably retain the exposed film unit.

It is another object of the present invention to provide in photographic apparatus of the type including processing means for engaging and advancing an exposed film unit along a film exit plane, film-engaging means including a portion through which the exposed film unit is adapted to be partially advanced by the processing means, and means engageable by the exposed film unit as the film unit is being advanced by the processing means for moving the film-engaging means between a first position in which the portion through which the film unit is a adapted to be partially advanced is out of alignment with the film exit plane, and a second position in which the portion is in alignment with the film exit plane to permit the film unit to be advanced therethrough, first resilient means for biasing the film-engaging means towards the first position and second resilient means for engaging the film unit in sliding frictional engagement as the film unit is being advanced through the portion to maintain the film-supporting means in the second position against the bias of the first resilient means and thereafter to cooperate with the portion to arrest motion imparted to the film unit upon disengagement from the processing means and to releasably retain the film unit.

It is the further object of the present invention to provide photographic apparatus of the foregoing type including film-engaging means adapted to support a plurality of film units and means for disenabling the operation of the apparatus when the number of film units supported by the film-engaging means exceeds a predetermined limit.

Another object of the present invention is to provide photographic apparatus of the aforementioned type wherein the film-engaging means is mounted for angular displacement relative to the film exit plane and the means for disenabling the operation of the apparatus are actuable when the displacement angle exceeds a predetermined limit.

Other objects of the invention will in part be obvious and will in part hereinafter.

The invention accordingly comprises the apparatus possessing the construction, combination of elements, and arrangement of parts which are exemplified in the following disclosure and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIGS. 9a, b, and c diagrammatically illustrate a means for disenabling the operation of the camera when the film retainer supports a predetermined number of film units.

DESCRIPTION OF THE PREFERRED EMBODIMENT

Figures 1, 2:
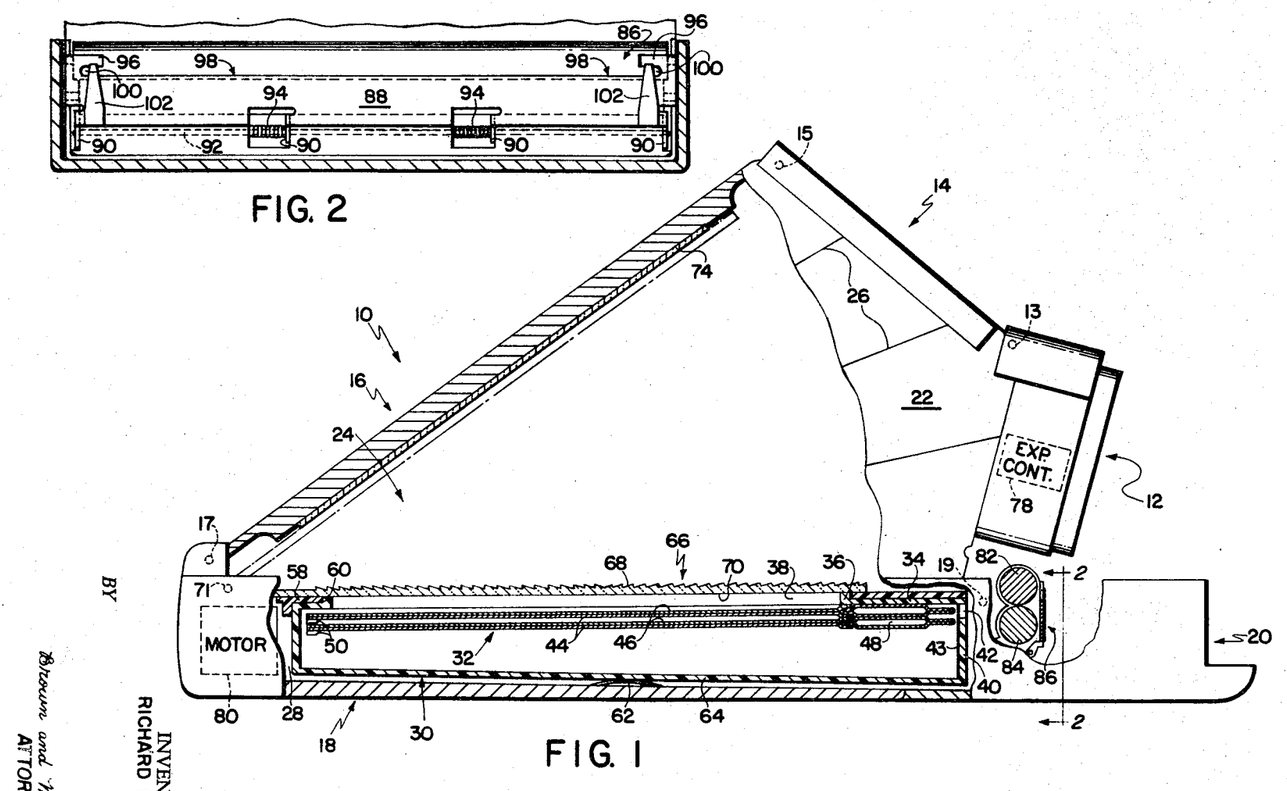
FIG. 1 is an elevational view, partly in section, of a camera embodying the instant invention shown in an extended or operative configuration, and illustrating the relative positions of components of the camera to a film unit located in position for exposure.
FIG. 2 is an elevational view taken along line 2—2 of the film retainer illustrating the placement of its component parts and its mounting on the camera.
Figure 3:
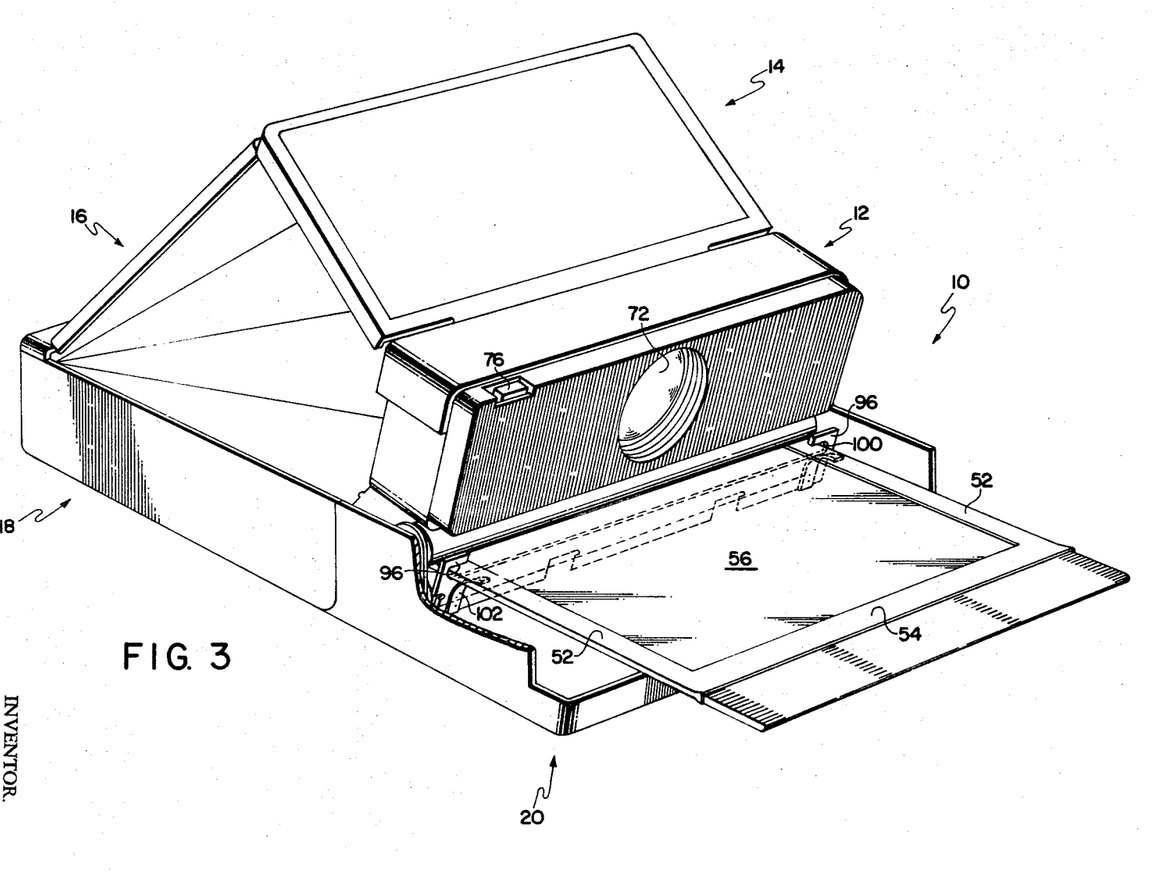
FIG. 3 is a perspective view of the camera of fIG. 1 illustrating a film unit advancing through pressure-applying rollers and in engagement with a film retainer.

Referring now to FIGS. 1, 2 and 3 of the drawings, a foldable, single-lens reflex camera of the self-developing type is shown generally at 10 in an extended and operative configuration. The camera 10 includes a plurality of housing sections 12, 14, 16 and 18 which cooperate with bellows 22 (only one side of which is shown) to form an exposure chamber 24 and a section 20 extending forwardly of section 18. Housing sections 12, 14, and 16 are adapted to pivot about axes 13, 15, 17 and 19 for movement between the extended position, as shown in FIG. 1, and a compact folded position. To fold camera 10, housing section 12 is rotated in a clockwise direction into the forward portion of housing section 20 with housing sections 14 and 16 forming a planar outer surface over a portion of housings 12 and 18, respectively. As camera 10 is folded, the bellows 22 collapses along memory lines 26 and is stored between the upper and lower housing sections.

Housing section 18 includes a chamber 28 for receiving and supporting a film container 30 preloaded with a plurality of film units 32 in stacked relation. The film container 30, as best shown in FIG. 1, includes a forward wall 34 having an integrally formed upstanding rib 36 which defines a generally rectangular aperture 38 through which light is admitted to expose the forwardmost film unit 32 contained therein. Upstanding rib 36 is adapted to be telescopically received by an opening 60 located in a support frame 58 for properly locating the forwardmost film unit 32 in position for exposure. Film container 30 further includes a leading end wall 40 having an elongated rectangular exit opening 42 therein through which a film unit is adapted to be moved subsequent to exposure, a flexible opaque sheet 43 covering exit opening 42 to block the passage of actinic light into the film container through exit opening 42, and a rear wall 64 adapted to be engaged by a spring 62 for urging the film container 30 toward support frame 58.

Each of the individual film units 32 includes: a photosensitive element 44; a superposed transparent image-receiving element 46; a pod 48 containing a viscous processing fluid joined to elements 44 and 46 at a leading end of the film unit; a fluid reservoir or trap 50 formed at the trailing end of the film unit; and an opaque binding element for securing the photosensitive element 44 and the image-receiving element 46 in face-to-face relation and also forming opaque peripheral margins on the transparent image-receiving element including lateral margins 52 and longitudinal margins 54 which define the bounds of a substantially rectangular image-forming area 56 as best shown in FIG. 3.

Pod 48 is adapted to rupture upon the application of compressive pressure, thereby releasing the viscous processing fluid which is spread between and in contact with elements 44 and 46 in a thin uniform layer covering the image-forming area 56 to initiate the development of film unit 32, as described in detail in U.S. Pat. No. 3,415,644, granted on Dec. 10, 1968, to E. H. Land and assigned to the same assignee as the instant invention.

Film units 32 are preloaded into film container 30 in stacked relation and are spring biased, by means not shown, toward forward wall 34. The film units 32 are positioned so that the transparent image-receiving element 46 faces toward the exposure aperture 38 which is substantially co-extensive with the image-forming area 56 of the film unit. The forwardmost film unit 32 is adapted to be exposed through exposure aperture 38 and then removed from the film container via exit opening 40 for processing. A rectangular slot (not shown) in forward wall 34 provides access to the forwardmost film unit for removing it from the film container. An opaque sheet (not shown) covering all of the apertures in film container 30 is initially provided within the film container to prevent exposure of the film units prior to insertion of the film container into the camera and is removable in the same manner as the forwardmost film unit once the film container is loaded into receiving chamber 28.

Access to receiving chamber 28 for loading or unloading a film container is provided by pivotally connecting housing section 20 to housing section 18 for movement in a clockwise direction from the operative position as shown in FIG. 1, thereby exposing an open end of chamber 28 through which the film container may be inserted or withdrawn. For details as to the construction of the receiving chamber 28 and the coupling and movement of housing section 20, reference may be had to U.S. patent application Ser. No. 102,775, filed on Dec. 30, 1970.

Camera 10, being of the single-lens reflex variety, is adapted to be operated first in a viewing and focusing mode and then in an exposure mode. A platelike reflex member 66, as shown in solid lines in FIG. 1 in its viewing and focusing position atop support member 58 and upstanding rib 36 covering apertures 38 and 60, forms a lighttight barrier between exposure chamber 24 and the receiving chamber 28, and includes an echelon-type mirror 68 on one side and a planar mirror 70 on the opposite side. Reflex member 66 which is adapted to pivot about axis 71 is spring biased for movement toward housing section 16 and is held in the viewing and focusing position by a latching member (not shown).

In the viewing and focusing mode of operation, light rays reflected from the scene to be photographed pass through an objective lens 72, mounted in housing section 12, and travel cross exposure chamber 24 until they impinge upon a planar mirror 74, fixedly mounted on an interior wall of housing section 16, and are then reflected toward echelon-type mirror 68 where they form an image of the scene to be photographed. From mirror 68 the light rays are redirected toward a suitable viewfinder (not shown) mounted on housing section 14. The operator views the image at mirror 68 through the viewfinder while adjusting objective lens 72 until the image is in sharp focus and then actuates a shutter release button 76 mounted on housing section 12.

Actuation of button 76 closes a normally open switch energizing an electronic exposure control circuit shown diagrammatically at 78 in housing section 12 which is adapted to sequentially energize and de-energize electronic components within the camera including a motor 80 mounted in the trailing end of housing section 18 during an exposure and processing cycle. Energy is supplied to exposure control circuit 78 by a battery which may be suitably mounted within camera 10 or may be provided within film container 30 to insure that there will be sufficient energy to expose and process all of the film units contained within the film container each time that a new film container is loaded into the camera.

Upon actuation of button 76, exposure control circuit 78 energizes normally open shutter means (not shown) causing the shutter means to move position blocking the passage of light into chamber 24 through lens 72 and the viewfinder is conditioned to prevent entry of light into chamber 24. Once chamber 24 is in a lighttight condition, reflex member 66 is unlatched, either electronically or mechanically, in response to movement of linkage driven by motor 80 and moves under the influence of the biasing spring to an exposure position parallel with and closely adjacent to fixed mirror 74, as shown in phantom lines in FIG. 1, with planar mirror 70 facing toward objective lens 72. The shutter means blocking objective lens 72 is then de-energized causing them to move to an unblocking position permitting light rays to strike mirror 70 from where they are reflected through exposure aperture 38 to expose the forwardmost film unit 32. After an appropriate exposure interval, the shutter means are again energized causing them to move to a position blocking passage of light through objective lens 72. Motor 80 which is coupled to reflex member 66 by suitable linkage is energized to drive reflex member 66 from the exposure position against the bias of the spring to the viewing and focusing position and into engagement with the latching member and the shutter means are de-energized. At the same time, motor 80 drives a film advancing mechanism, positionable through the aperture in forward wall 34 of the film container, to engage the exposed forwardmost film unit 32 and advance it through exit opening 42 into the bite of a pair of juxtaposed pressure-applying rollers 82 and 84.

The upper roller 82 is mounted in a fixed position and the lower roller 84 is mounted for vertical displacement relative to roller 82 and is spring biased upwardly with a suitable stop being provided to maintain a predetermined space or gap between the two pressure-applying rollers. Roller 82 is adapted to be rotatably driven, by suitable transmission means coupled to motor 80, in a counterclockwise direction to advance the exposed film unit along a film exit plane which contains the gap between the pressure-applying rollers and is substantially perpendicular to a plane containing the longitudinal axes of rollers 82 and 84. Referring to FIG. 1, the film exit plane is essentially a horizontal plane passing between the juxtaposed rollers and is perpendicular to a vertical plane passing through the axes of the upper and lower rollers.

As best shown in FIGS. 4–7, as the leading end of the film unit passes between the rollers, roller 84 moves downwardly against the bias of the spring to accommodate the thickness of the fluid containing pod 48. The rollers apply a compressive pressure to the pod causing it to rupture, thereby releasing the viscous processing fluid. Upon release of the fluid, the pod collapses and the lower roller 84 moves upwardly to maintain the predetermined spacing between the rollers. The rollers spread the processing fluid in a thin, uniform layer between and in contact with the photosensitive element 44 and the image-receiving element 46 with the predetermined spacing between the rollers controlling the thickness of the ayer of fluid. The film unit is advanced at a constant rate, approximately seven inches per second, spreading the processing fluid over the image-forming area 56 of the film unit with any excess fluid being deposited in the fluid reservoir or trap 50 at the trailing end of the film unit. It will be noted that the fluid reservoir or trap 50 is thicker than that portion of the film unit extending forwardly of the trap, and as the trap is engaged in the bite between rollers 82 nd 84, the lower roller 84 is moved downwardly allowing the trap to pass between the rollers, and then abruptly moves upwardly toward the upper roller 82 under the influence of the biasing spring tending to nip the trailing edge of the film unit which increases its forward velocity. Once the film unit has passed through the rollers, the electronic control circuit 78 de-energizes motor 80, thereby completing the exposure and processing cycle. For details as to the sequential functioning of the electronic control circuit 78, reference may be had to U.S. patent application Ser. No. 68,919, filed on Sept. 2, 1970, and assigned to the same assignee as the present invention.

Figures 4, 5, 6, 7, 8:
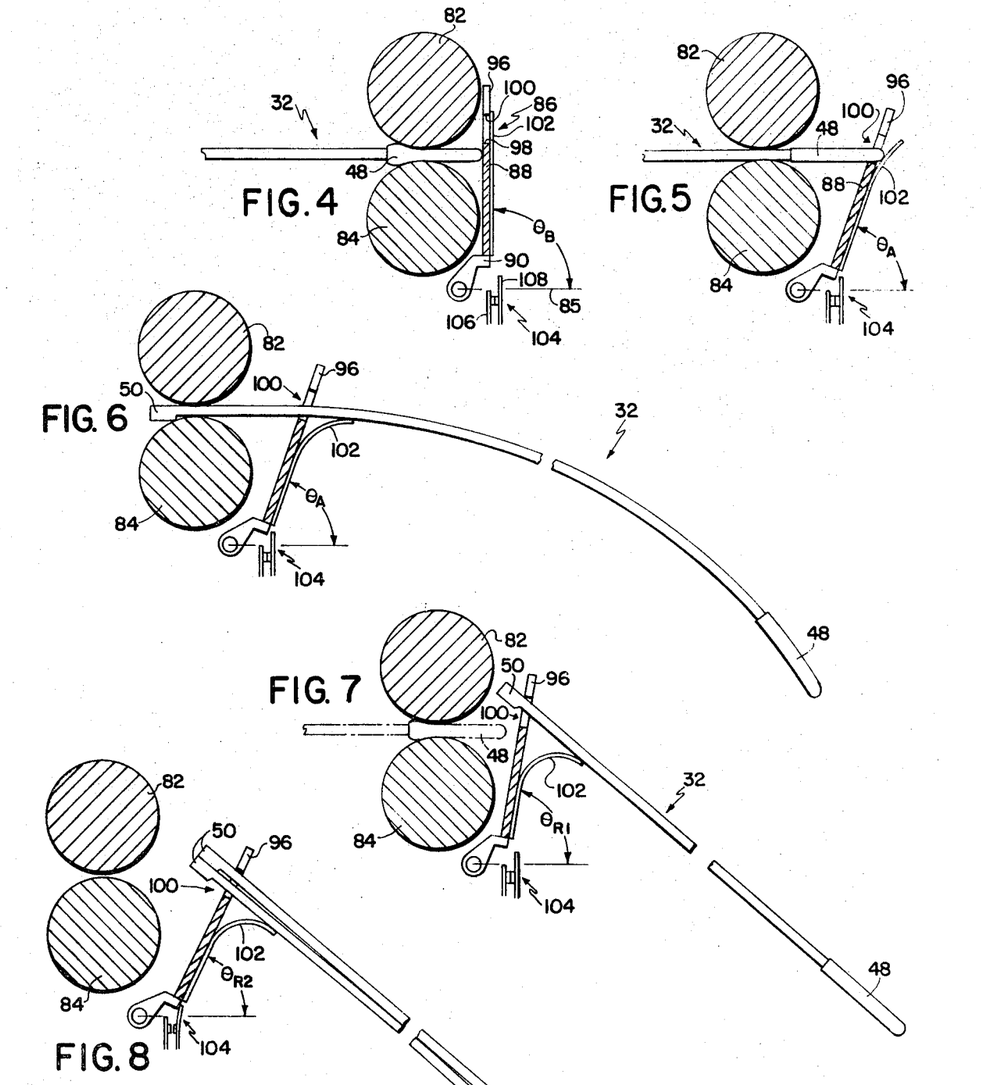
FIGS. 4 through 7 are elevational views, partly in section, of the pressure-applying rollers and a film retainer illustrating the progressive advancement of a film unit through the rollers and into engagement with the film retainer showing the displacement angle of the film retainer relatively to the film exit plane.
FIG. 8 is an elevational view, partly in section, of the processing rollers and film retainer illustrating the displacement angle of the film retainer relative to the film exit plane while supporting two film units.

As the leading end of the exposed film unit passes from between rollers 82 and 84, it engages a film retainer 86 located outboard of rollers 82 and 84. Film retainer 86, see FIG. 2., includes a thin, elongated film support plate 88, laterally dimensioned to extend across the length of pressure-applying rollers 82 and 84, having four integrally formed, rearwardly extending mounting flanges 90. Each flange 90 has a mounting hole therein through which a mounting axle 92 is inserted for pivotally mounting plate 88 on the exit side of the pressure-applying rollers. A pair of helically wound springs 94, circumscribing axle 92, each having one end secured to structure supporting the pressure-applying rollers and the opposite end secured to plate 88, are provided for spring biasing the film retainer 86 toward the upright position as shown in FIGS. 1 and 4. Film support plate 88 further includes a pair of film-engaging arms 96 extending upwardly and inwardly from a horizontal edge 98 at the upper portion of plate 88 which form openings 100 therebetween through which a film unit is adapted to be advanced. It will be noted that film-engaging arms 96 are dimensioned so as to only overlie the lateral margins 52 of the film unit as it is advanced through openings 100. A pair of resilient fingers 102 are secured to the bottom portion of plate 88 and extend upwardly and in covering relation to the openings 100 between the film-engaging arms 96 and the horizontal edge 98.

Referring now to FIGS. 4–8, for purposes of illustration, a base line 85, substantially parallel to the film exit plane, is provided to show the relative angle $\theta$ between film retainer 86 and the film exit plane. As best shown in FIG. 4, the biasing springs 94 maintain film retainer 86 in an upright position substantially perpendicular to the film exit plane with horizontal edge 98 positioned above the space or gap between the pressure-applying rollers so that openings 100 are out of alignment with the film exit plane. In this position, film retainer 86 functions as a light barrier blocking the passage of actinic light through the space between the pressure-appling rollers which may cause the fogging of a film unit which has been advanced through exit opening 42 of the film container but has not as yet advanced far enough so that the leading edge of the film unit is in engagement with the pressure-applying rollers. The angle between the film retainer 86 in the blocking position and the film exit plane is denoted as $\theta_b$.

As the film unit is advanced through the rollers, the leading edge of the film unit engages plate 88 below horizontal edge 98 causing film retainer 86 to rotate in a clockwise direction until openings 100 are in alignment with the film exit plane at a displacement angle of $\theta_a$, denoting alignment, thereby permitting the leading edge of the film unit to pass through openings 100 and into engagement with resilient fingers 102 as shown in FIG. 5. The relative spring gradients are selected such that the resilient fingers 102 have a lower spring gradient or spring constant than the biasing springs 94. As the film unit continues to advance through openings 100, the resilient fingers 102 deflect as shown in FIGS. 5, 6, and 7 and engage the lateral margins 52 on the underside of the film unit 32 in sliding frictional engagement. It will be noted that by properly selecting the relative spring gradients of biasing springs 94 and resilient fingers 102, it is possible to maintain film retainer 86 at a predetermined angle $\theta_a$ against the bias of springs 94 when a film unit is in engagement with the fingers 102 and being advanced through openings 100 by rollers 82 and 84. As the film unit 32 is further advanced through openings 100 in sliding frictional engagement with resilient fingers 102, the fingers 102 lift the film unit 32 above edge 98 as best shown in FIG. 6 so that edge 98 does not contact the underside of the image-forming area 56. Upon disengagement of the trailing end of the film unit 32 from the pressure-applying rollers, the film unit rotates in a clockwise direction about the area of contact between the marginal edges 52 on the underside of the film unit and the resilient fingers 102 due to the weight of the film unit extending forwardly of the resilient fingers, causing the lateral margins 52 on the upper surface of the film unit 32 to move into sliding frictional engagement with film-engaging arms 96. The combined frictional forces applied to lateral margins 52 by the resilient fingers 102 and the film-engaging arms 96 are sufficient to arrest the motion imparted to the film unit upon disengagement from the pressure-applying rollers and thereafter to releasably retain the film unit until it is removed by the operator of the camera. It may be noted from FIGS. 6 and 7 that the amount of frictional force applied to the advancing film unit by the film retainer 86 is a function of the angle formed between the portion of the film unit located in the film exit plane and the film retainer. For example, in FIG. 6, the film unit and the film retainer form an obtuse angle therebetween with resilient fingers 102 being the only component of the film retainer 86 in engagement with the lateral margins 52. As best seen in FIG. 7, when the film unit 32 and the film retainer 86 form an acute angle therebetween, the resilient fingers 102 are further deflected, applying a greater frictional force to lateral margins 52 and, additionally, film-engaging arms 96 are in engagement with the upper lateral margins 52.

Once the film unit 32 has been disengaged from the pressure-applying rollers, it is desirable to change the angle between the film unit 32 and the film retainer 86 as rapidly as possible to counteract the forward momentum of the film unit 32 by applying maximum frictional force to the film unit. In addition to the clockwise rotation of the film unit due to the weight of that portion of the film unit forward of resilient fingers 102, the biasing springs 94 rotate the film retainer 86 in a counterclockwise direction toward the blocking position which also aids in rapidly changing the angle between the film retainer 86 and the film unit 32.

As best shown in FIG. 3, the advancing film unit extends beyond the leading edge of housing section 20 and is retained in a position, as best shown in FIG. 7, with the trailing end of the film unit in engagement with film retainer 86 and a portion of the film unit forward of the trailing end resting on the leading edge of housing section 20. It will be noted that the weight of one retained film unit counteracts the counterclockwise bias of springs 94 so that the film retainer 86 is maintained at a displacement angle of $\theta_{r1}$, denoting one retained film unit, which is intermediate angles $\theta_b$ and $\theta_a$.

It will be noted that the retained film unit in FIG. 7 is maintained at an acute angle relative to the film retainer 86 and is positioned so as to be in closing relation with the bite between rollers 82 and 84 acting as a light barrier to prevent actinic light from passing between the pressure-applying rollers. Should the operator of the camera actuate shutter release button 76 to initiate a second exposure and processing cycle, a second film unit, shown in phantom lines in FIG. 7, passing between the rollers may pass through openings 100 and into engagement with resilient fingers 102 so as to be supported in and retained in a position underlying the first retained film unit as shown in FIG. 8. It will be noted that the combined weight of the two retained film units causes film retainer 86 to be maintained at a displacement angle of $\theta_{r2}$, denoting two retained film units, which is smaller than angle $\theta_a$ or, more accurately, a position of maximum displacement relative to the blocking position of $\theta_b$.

As a safety precaution, means may be provided for disenabling the operation of the camera when a predetermined number of film units are supported by the film retainer 86, or when the angular displacement angle $\theta$ of film retainer 86 exceeds a predetermined limit. For example, FIGS. 4–8 illustrate a method for disenabling the operation of the camera 10 when two film units are supported and retained by film retainer 86. A pair of normally closed electrical contacts 104 are connected in series to the normally open switch in electronic control circuit 78 which is adapted to be closed upon actuation of shutter release button 76. One contact is mounted on a fixed support member 106, the second contact is mounted on a resilient support member 108 which extends into the path of travel of mounting flange 90. It will be noted that flange 90 does not engage support member 108 until the film retainer 86 is displaced at an angle $\theta_{r2}$ which in turn is a function of the combined weights of the two retained film units where it deflects support member 108 in a clockwise direction, thereby opening contacts 104 which in turn disenables electronic control circuit 78. Removal of the two retained film units will cause film retainer 86 to rotate in a counterclockwise direction permitting member 108 to return to the position shown in FIGS. 4, 5, 6 and 7, thereby closing contacts 104.

Figure 9:
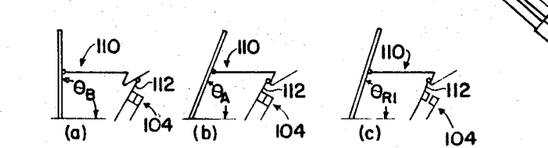

An alternative method of disenabling the operation of camera 10 when only one film unit is supported by film retainer 86 is diagrammatically illustrated in FIGS. 9 a, b, and c. A flexible arm 110 is attached to film retainer 86 and is adapted to ride up and over a resilient support member 112 as the film retainer is rotated in a clockwise manner from the blocking position to the alignment position. Once the film unit 32 is disengaged from the processing rollers, and film retainer 86 is rotated in a counterclockwise manner toward the $\theta_{r1}$ retaining position, arm 110 is adapted to engage resilient support member 112 deflecting it in a counterclockwise direction (see FIG. 9c) opening the two normally closed contacts 104, thereby disenabling control circuit 78. Removal of the retained film unit permits bias spring 94 to rotate film retainer 86 toward the blocking position with sufficient force to disengage arm 110 from support member 112, thereby allowing contacts 104 to return to their normally closed position.

SUMMARY OF THE INVENTION

From the foregoing it can be seen that there has been disclosed photographic apparatus of the type including processing means for engaging and advancing an exposed film unit along a film exit plane toward the exterior of the apparatus while distributing a processing fluid across an image-forming area of the film unit and film-engaging means for engaging and supporting at least one exposed film unit only at peripheral edges thereof which form margins surrounding the image-forming area of the film unit to releasably retain the exposed film unit. The film-engaging means include a portion through which the film unit is adapted to be partially advanced by the processing means and includes means engageable by the film unit as it is advanced by the processing means for moving the film-engaging means between a first position in which the portion is out of alignment with the film exit plane and a second position in which a portion is in alignment with the film exit plane to permit a film unit to be advanced therethrough. First resilient means are provided for biasing the film-engaging means toward the first position and second resilient means adapted to engage the film unit in sliding frictional engagement as the film unit is advanced through the portion are provided to maintain the film-engaging means in the second position against the bias of the first resilient means and thereafter the second resilient means cooperate with the portion to arrest motion imparted to the film unit upon disengagement from the processing means and to releasably retain the film unit. The photographic apparatus also includes means for disenabling operation of the apparatus when the number of film units supported by the film-engaging means exceeded a predetermined limit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:
   processing means for engaging and advancing an exposed film unit along a film exit plane toward the exterior of said apparatus while distributing a processing fluid across an image-forming area of the film unit; and
   film engaging means for selectively engaging and supporting at least one film unit only along peripheral edges thereof which form margins surrounding the image-forming area as the film unit is advanced along the film exit plane by said processing means and for arresting the motion of the film unit upon its disengagement from said processing means to releasably retain the film unit on said apparatus.

2. Photographic apparatus as defined in claim 1 further including means for disenabling the operation of said apparatus when the number of film units supported by said film-engaging means exceeds a predetermined limit.

3. Photographic apparatus as defined in claim wherein said predetermined limit is more than one film unit.

4. Photographic apparatus as defined in claim 1 wherein said film engaging means includes a plate having an open portion therein through which the film unit is adapted to be partially advanced by said processing means, said plate further including a pair of film engaging arms for selectively engaging lateral margins of the film unit when the film unit is disengaged from said processing means to releasably secure the film unit to said plate.

5. Photographic apparatus as defined in claim 4 wherein said film engaging means is adapted to releasably retain more than one film unit at a time on said apparatus.

6. Photographic apparatus comprising:
   processing means for engaging and advancing an exposed film unit along a film exit plane toward the exterior of said apparatus while distributing a processing fluid across an image-forming area of the film unit;
   film-engaging means for engaging and supporting at least one exposed film unit only along peripheral edges thereof which form margins surrounding the image-forming area of the film unit to releasably retain the exposed film unit;

means for mounting said film-engaging means for angular displacement relative to said film exit plane, said displacement angle being determined by the number of film units supported by said film-engaging means; and
means for disenabling the operation of said apparatus when said displacement angle exceeds a predetermined limit and the number of film units supported by said film-engaging means required to exceed said predetermined limit is more than one.

7. Photographic apparatus comprising:
processing means for engaging and advancing a film unit along a film exit plane;
film-engaging means including a portion through which the film unit is adapted to be partially advanced by said processing means and means engageable by the film unit as the film unit is being advanced by said processing means for moving said film-engaging means between a first position in which said portion is out of alignment with said film exit plane and a second position in which said portion is in alignment with said film exit plane to permit the film unit to be advanced therethrough;
first resilient means for biasing said film-engaging means toward said first position; and
second resilient means for engaging the film unit in sliding frictional engagement as the film unit is being advanced through said portion to maintain said film-engaging means in said second position against the bias of said first resilient means and thereafter to cooperate with said portion to arrest motion imparted to the film unit upon disengagement from said processing means and to releasably retain the film unit.

8. Photographic apparatus as defined in claim 7 wherein said film-engaging means is mounted for angular displacement relative to said film exit plane and the relative spring gradients of said first and second resilient means are selected so that said second position is at a predetermined displacement angle.

9. Photographic apparatus as defined in claim 8 wherein the spring gradient of said second resilient means is lower than the spring gradient of said first resilient means.

10. Photographic apparatus as defined in claim 8 wherein said portion and said second resilient means apply a frictional force to the film unit to arrest motion and releasably retain the film unit upon disengagement thereof from said processing means.

11. Photographic apparatus as defined in claim 10 wherein the amount of frictional force is dependent on the relative angle between the film unit and said film-engaging means as the film unit moves through said portion.

12. Photographic apparatus as defined in claim 11 wherein, upon disengagement of the film unit from said processing means, said first resilient means moves said film-engaging means toward said first position, thereby rapidly changing the relative angle between said film-engaging means and the film unit to apply maximum frictional force to the film unit.

13. Photographic apparatus as defined in claim 7 wherein said film-engaging means reduces admission of light into said apparatus when in said first position.

* * * * *